United States Patent [19]

Hoie

[11] Patent Number: 6,153,629
[45] Date of Patent: Nov. 28, 2000

[54] USE OF A COMBINATION OF AN ANTI-SMOKING COMPOSITION AND A DIETARY COMPOSITION IN SMOKING CESSATION

[75] Inventor: Lars Henrik Hoie, London, United Kingdom

[73] Assignee: Nutri Pharma ASA, Oslo, Norway

[21] Appl. No.: 09/091,894

[22] PCT Filed: Feb. 12, 1998

[86] PCT No.: PCT/IB98/00178

§ 371 Date: Jun. 25, 1998

§ 102(e) Date: Jun. 25, 1998

[87] PCT Pub. No.: WO98/35699

PCT Pub. Date: Aug. 20, 1998

[30] Foreign Application Priority Data

Aug. 29, 1997 [DK] Denmark .................................. 994/97

[51] Int. Cl.$^7$ .................................................. A61K 31/44
[52] U.S. Cl. ............................................ 514/343; 514/813
[58] Field of Search ...................................... 514/343, 813

[56] References Cited

U.S. PATENT DOCUMENTS 5,700,782 12/1997 Cope et al. ................................ 514/21

OTHER PUBLICATIONS

Pirie P., Effects of Nicotine Gum on Postcessation Weight Gain, *Health Psychol* 11, pp. 53–54 (1992).

Hall SM et al., "Weight Gain Prevention and Smoking Cessation: Cautionary Findings," *Am J Public Health*, vol. 82, No. 6, pp. 799–803, Jun. 1992.

Aspinall G.O. et al., "Polysaccharide Components of Soybeans," *Cereal Science Today*, vol. 12, No. 6, pp. 223–260, Jun. 1967.

Basler H.–D. et al: "Nicotine gum assisted group thera$_{py}$ in smokers with an increased risk of coronary disease–evaluation in a primary care setting format"; *Health Educ. Res.*, 1992, 7/1 (87–95).

Shapiro, Florrey et al: "Smoking Cessation And Severity of Weight Gain (Corresponden$_c$e)"; *The New E$_n$gland Journal of Medicine*, Aug. 15, 1991; 325 (7), pp. 517–518.

Nides M. et al: "Weight gain as a function of smoking cessation and 2–mg nicotine gum use among middle–aged smokers with mild lung impairment in the first 2 years of the Lung Health Study"; *Health Psychol.*, Jul. 1994, 13 (4) p. 354–361.

Gross J. et al: "Nicotine replacement ten–week effects of tobacco withdrawal symptoms":Psychopharmacology 98 (3), 1989, 334–341.

Bakhit et al., "Intake of 25 g of Soybean Protein with or without Soybean Fiber Alters Plasma Lipids in Men with Elevated Cholesterol Concentrations",*Human and Clinical Nutrition,* 124:213–222, 1994.

Slavin, "Nutritional benefits of Soy pro$_{te}$in and soy fiber", *Perspectives in Practice,* vol. 91, No. 7 pp. 816–819, Jul. 1991.

Potter et al., "Depression of plasma cholesterol in men by consumption of baked products containing soy protein",*Am. J. Clin. Nutr.,* 58:501–506, (1993).

*Protein Technologies International,* "Soy bean renaissance", Food Industry News, pp. 12–13, Feb. 1995.

Brewer et al., "Effect of Soy Protein Isolate and Soy Fiber on Color, Physical and Sensory Characteristics Baked Products", *Journal of Food Quality,* 15:245–262, (1992).

*Primary Examiner*—Kimberly Jordan
*Attorney, Agent, or Firm*—Iver P. Cooper

[57] ABSTRACT

A combination of a dietary composition and an anti-smoking composition which has the effect of increasing the number of people successfully completing a cure of smoking cessation and/or nicotine dependence. The dietary composition has a calorie content equivalent to a maximum of 1200 kcal per day. Used in combination with an anti-smoking composition, the dietary composition generates a higher rate of success with respect to smoking cessation as compared to a conventional anti-smoking composition. The dietary composition may be a VLCD (very low calorie diet) comprising a calorie content equivalent to about 400 to 800 kcal per day, when used to replace a full-diet. The dietary composition can also be in the form of a LCD (low calorie diet) comprising a calorie content equivalent to about 800–1200 kcal per day. The dietary composition can be used for providing a preparation for promoting smoking cessation and/or treatment of nicotine dependence.

58 Claims, 4 Drawing Sheets

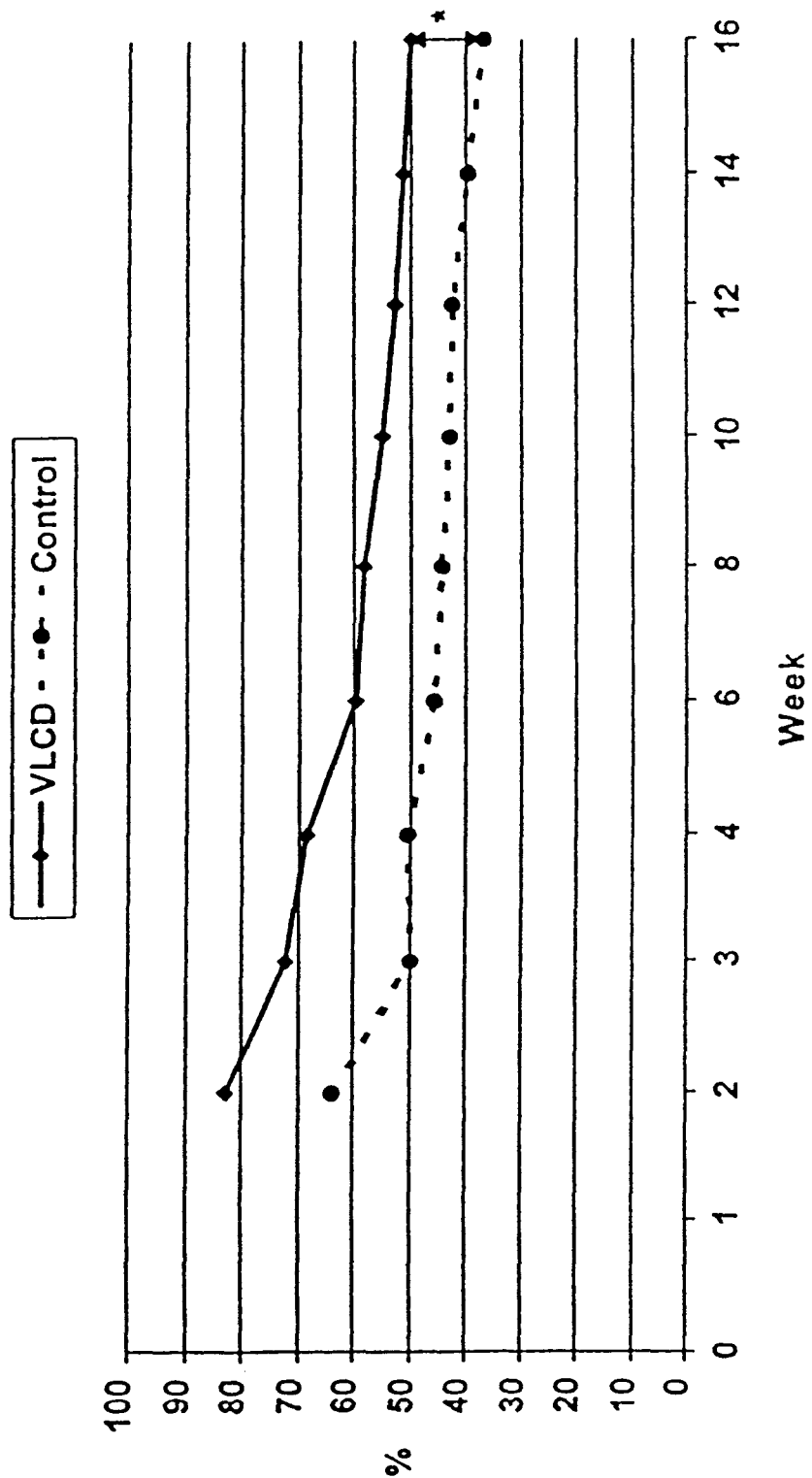
Figure 1. Number of completely abstinent subjects from week two to sixteen. *; p<0.05.

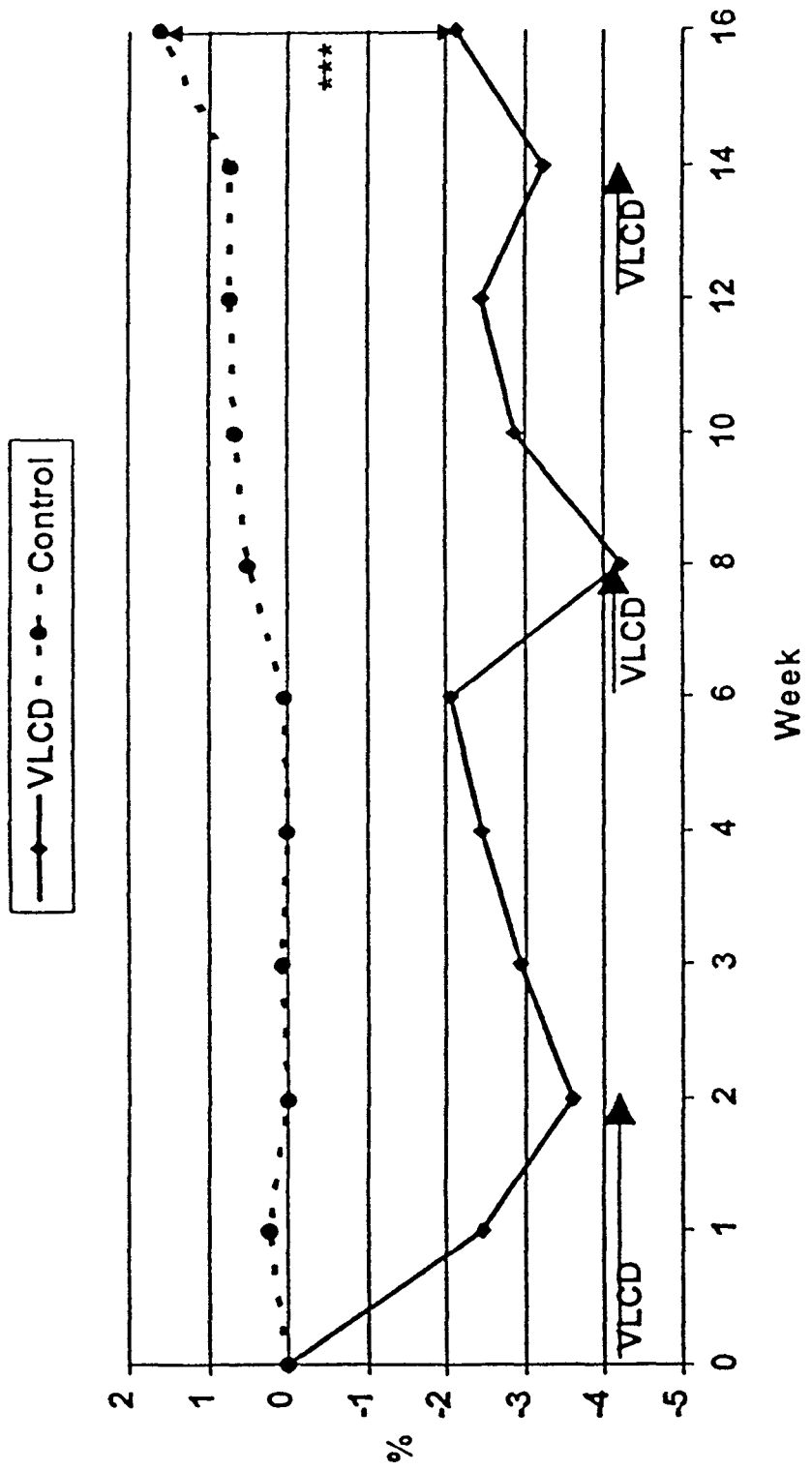
Figure 2. Weight developement in completely abstinent subjects. ***; p<0.001.

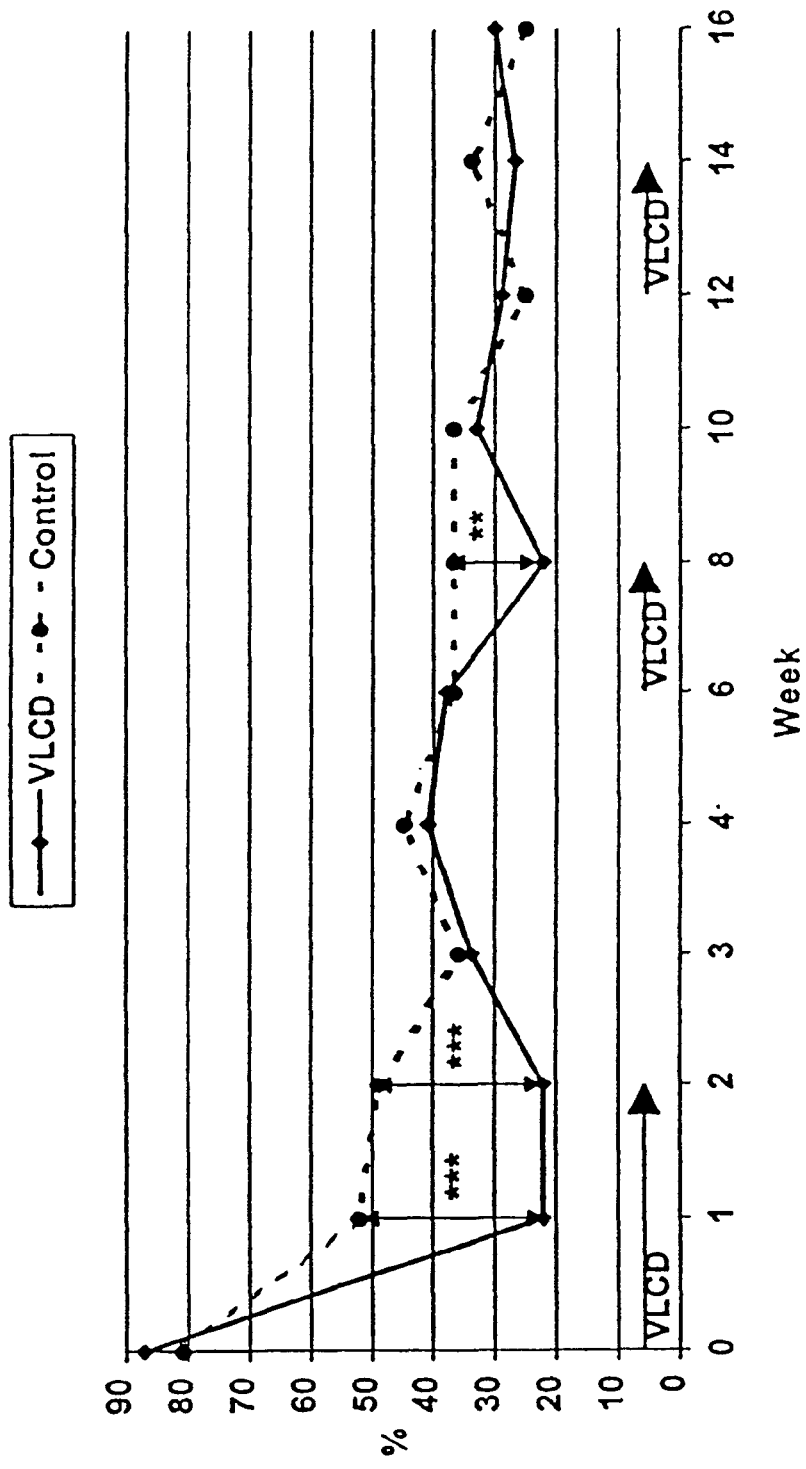
Figure 3. % of subjects rating 'Craving for cigarettes' as 'moderate' or 'severe'. *** p<0.001, * p<0.05. N.s. at all other times. VLCD was used from week 0 to 2, 6 to 8 and 12 to 14.

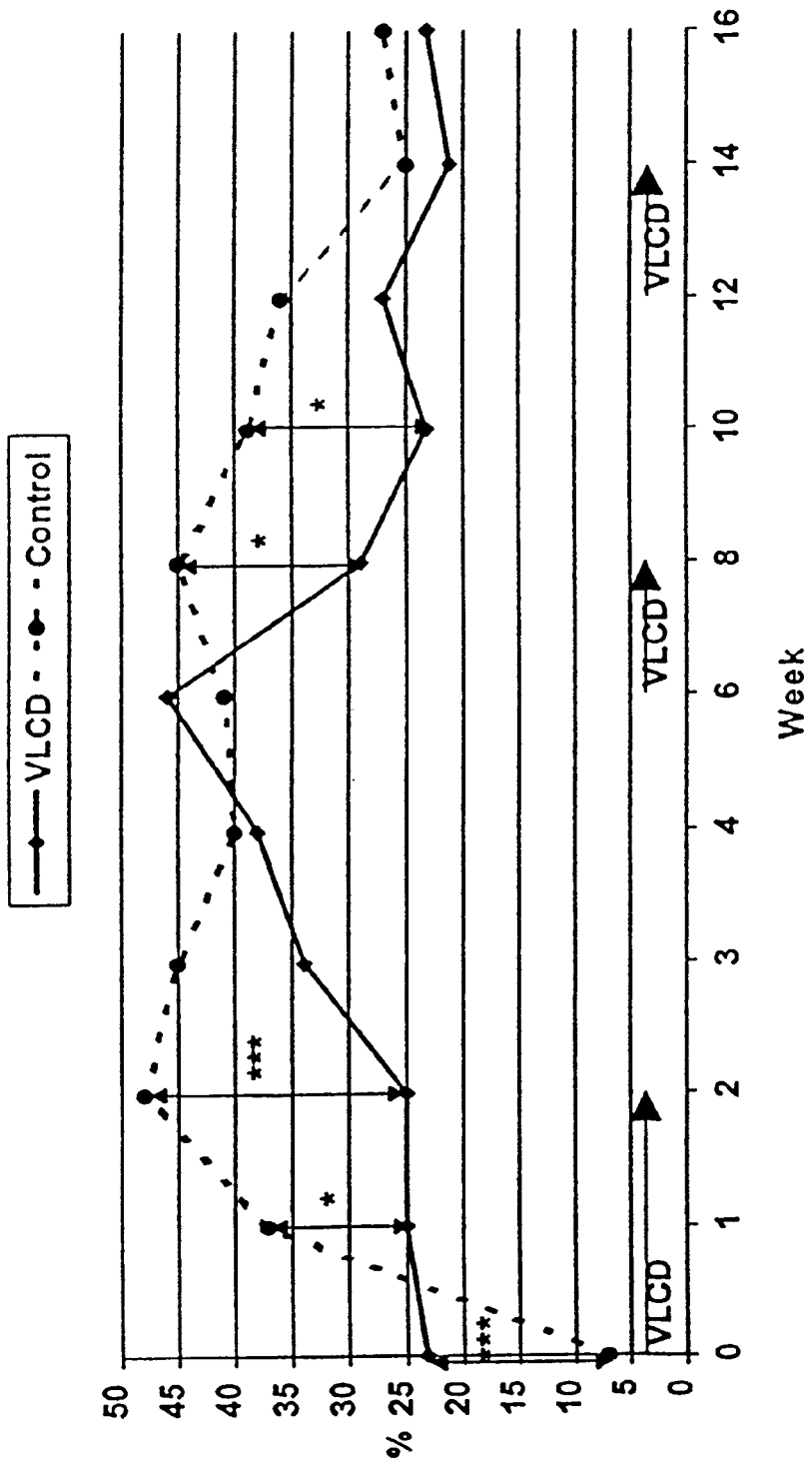
Figure 4. % of subjects rating 'Increased appetite' as 'moderate' or 'severe'. * $p<0.001$,  $p<0.01$, * $p<0.05$. N.s. at all other times. VLCD was used from week 0 to 2, 6 to 8 and 12 to 14.

USE OF A COMBINATION OF AN ANTI-SMOKING COMPOSITION AND A DIETARY COMPOSITION IN SMOKING CESSATION

This application is a 371 of PCT/IB98/00178, filed Feb. 12, 1998. It is also a continuatin-in-part of PCT/IB97/00152, filed Feb. 12, 1997. Priority is claimed under §119 from DK994/97 filed Aug. 29, 1997.

The invention generally relates to a combination of an anti-smoking composition such as a nicotine-releasing agent and a dietary composition and use of this combination in smoking cessation and/or a cure of nicotine addiction. There is also provided a method of curing an individual of nicotine dependence and a kit comprising an anti-smoking composition in the form of a nicotine-releasing agent in combination with a dietary composition.

BACKGROUND OF THE INVENTION

Medical evidence has established that cigar and pipe smoking cause cancer of the oral cavity and that cigarette smoking is directly linked to lung cancer. Smokeless tobaccos such as chewing tobacco and snuff have also been associated with increased risks of cancer of the oral cavity. In many countries today, as many as one third of all cancer deaths can be attributed to cigarette smoking. Smoking also increases the risks of contracting diseases of the heart and lungs. This is due to the fact that tobacco smoke has a high content of hazardous particles, including nicotine, a high content of carbonmonooxid (CO) and a high content of tar, all of which seriously affect the proper functioning of both airways and lungs. It has been shown that regular smoking over a prolonged period of time leads to an increased risk of diseases of the airways, such as e.g. chronic bronchitis.

Nicotine is an alkaloid and one of many poisonous substances contained in tobacco. Nicotine is generally regarded as being addictive and generates a mild narcotic effect. Other well known alkaloids are e.g. cocaine, morphine and strychnine.

Nicotine is a serious health hazard and has a contracting effect on the vascular system as it constricts the blood vessels and leads to a raised blood pressure. These effects put a strain on the heart function. It is not known for certain if nicotine alone, or in combination with one or more of the more than four thousand different substances present in tobacco, causes the long-term health hazards associated with tobacco smoking and/or use of tobacco. "Use of tobacco" when used herein should be understood to comprise all aspects of tobacco use leading to an intake of nicotine, be it through smoking or otherwise. Consequently, the tobacco may be in the form of tobacco for use in a cigarette, a cigar, pipe tobacco, chewing tobacco, snuff and the like.

It is well known that tobacco suppresses the appetite and accordingly, many people use tobacco as an aid in weight control. As a consequence hereof, many people wishing to stop smoking often experience that a tobacco use cessation is associated with an undesirable weight gain that may easily counteract the otherwise positive effects associated with a non-smoking life-style. The conventional "anti-smoking compositions" available on the market often do not adequately take into account the undesirable effects of a weight gain associated with the unaided decision to stop smoking or the deliberate participation in a cure of nicotine dependence.

"Anti-smoking composition" in the context used above should be understood as a composition generally intended for helping an individual to stop smoking. Examples of such "anti-smoking composition" are listed on pages 822–823 of the Danish Drug Catalogue (1997). The composition may be in the form of a nicotine-releasing agent such as a nicotine-containing chewing gum or a nicotine patch. The term "anti-smoking composition" is thus used to describe nicotine-releasing agents for use by an individual in locations where smoking is prohibited as well as nicotine-releasing agents used as a substitute for nicotine-containing tobacco during a cure of nicotine dependence.

The provable connection between tobacco use and the numerous health hazards associated therewith has led many people, especially smokers, to decide quitting the habit and stop using tobacco. The statistics are very convincing: More than 80% of all smokers express a desire to stop smoking, and each year 35% try to stop smoking, but less than 5% are successful in unaided attempts to quit the habit. (American Psychiatric Association, Diagnostic and Statistical Manual of Mental Disorders, DSM-IV™, 4th edition, 1995; p. 242–7).

The addiction to nicotine results in the occurrence of well known withdrawal symptoms in an individual following smoking cessation. The severity of the symptoms depends on the period of time and the amount of nicotine used. The withdrawal symptoms make it very difficult for many people to break their habit of smoking and/or using tobacco. Nicotine dependence and withdrawal will occur following use of any form of tobacco (cigarettes, cigars, pipe tobacco, snuff and the like) as well as with prescription medications (nicotine chewing gums, patches and the like). The relative ability of a tobacco to generate a dependence and/or to induce a withdrawal is associated not only with the nicotine content of the tobacco in question, but also with the route of administration. The dependence is most pronounced for smoking tobacco and a decreasing dependence is observed over the range from smoking to oral intake to transdermal administration.

Nicotine dependence is manifested by the absence of nausea, dizziness and other characteristic symptoms despite using substantial amounts of nicotine. Nicotine withdrawal associated with tobacco use cessation will often induce symptoms such as for example lack of concentration, anxiety, a dysphoric or depressed mood, anger, restlessness, frustration, insomnia, irritation, a reduced heartbeat frequency and an increased appetite, which in turn often results in a weight gain. Smoking and/or tobacco use cessation after a regular daily intake of nicotine over a period of e.g. several weeks will generate the above-mentioned symptoms. Accordingly, it is the lack of nicotine at the time following smoking cessation which leads to the above-described symptoms. (American Psychiatric Association, Diagnostic and Statistical Manual of Mental Disorders, DSM-IV™, 4th edition, 1995; p. 242–7).

Much research has shown that for many tobacco smokers and/or users, smoking cessation leads to a subsequent weight gain. In an American analysis it was furthermore shown that women generally have a tendency to gain more weight after smoking cessation than men. It was found that after smoking cessation, the women participating in the study gained an average of 3.8 kg, while the men only gained an average of 2.8 kg. (Williams D F., Madans J., Anda R F., et al. Smoking cessation and severity of weight gain in a national cohort. N. Engl.J. 1991; 324; p. 739–45).

Several commercially available products have been introduced in order to facilitate smoking cessation. Many of these products contain nicotine and release the nicotine during use of the product. Among such products are NICORETTE® chewing gum and NICORETTE® inhaler from Pharmacia & Upjohn A/S, NICOTINELL® chewing gum and nicotine patches from Ciba A/S, or NICOLAN® nicotine patches from Astra A/S.

Use of the above-mentioned products reduces some, but not all, of the withdrawal symptoms which occur in connection with smoking cessation. Although the above-mentioned products contain nicotine, which is subsequently released to the user during use, it is not unusual that the user gains weight, even when using these products. The weight gain is one major reason for many people to start smoking again. Psychological factors also seem to play a role, and may also explain the increased appetite experienced by many people after smoking cessation. It is well-known that some people following smoking cessation start to eat compulsively and often console themselves with cakes, sweets and the like.

The increased appetite and compulsive eating may well lead to a weight gain, unless the individuals dietary and/or exercising habits are not altered accordingly. On the basis of this knowledge and in expectation of an increased appetite, and possibly also compulsive eating habits, many people will try to change their diet in connection with smoking cessation and/or use of tobacco. However, it is not always easy to change ordinary eating habits and start eating dietetic food or a diet containing a low amount of calories. In fact, loosing weight is for many people a big enough problem in itself.

In some cases, the weight gain in connection with tobacco use cessation may well be so predominant that it bounces the advantages naturally associated with tobacco use cessation. Several studies have shown that a weight gain is more pronounced among women than among men. For many women a weight gain in connection with tobacco use cessation is unacceptable and causes women to take up smoking again.

More factors can explain the weight gain, such as e.g. a change in the metabolic state and turn-over, a change in the perception of desirable or preferred foods as well as psychological factors including intake of foods as a substitute for the psychological effect previously provided by tobacco smoking. Even though the change in the basal metabolic state may not be easily controlled by a subsequent change in dietary habits, some of the other factors can be controlled in order to prevent an individual from taking up smoking again. It has been attempted to combine weight control programmes and smoking cessation, but without any real success.

Applicants co-pending application PCT/IB97/00152 discloses a dietary composition on the basis of soybean ingredients. More particularly, the invention relates to a dietary composition which is useful as a weight-reducing diet for overweight or obese people or generally useful for lowering serum lipids.

The invention described in PCT/IB97/00152 is based on the observation that serum lipid concentrations in subjects having an increased serum lipid concentration were significantly lowered following the intake of the dietary composition. As an additional benefit, the composition not only lowers increased serum lipid concentrations, but also has a lipid-lowering effect in individuals having a normal serum lipid concentration.

Dietary compositions disclosed in PCT/IB97/00152 are also capable of reducing the level of total cholesterol and total triglycerides. The HDL/LDL-cholesterol ratio in serum is also improved. High serum levels of cholesterol generated by e.g. smoking cause disease and death by contributing to the formation of atherosclerotic plaques in arteries throughout the body.

SUMMARY OF THE INVENTION

The objective of the invention is to provide a combination which has the effect of increasing the number of people successfully completing a cure of smoking cessation and/or nicotine dependence.

The dietary composition of the present invention is also useful in an anti-smoking programme to reduce and/or eliminate a weight gain after smoking cessation. For such a purpose, a dietary composition according to the present invention may be used in combination with an anti-smoking composition in the form of for example a nicotine-releasing agent or a nicotine substitute such as nicotine-containing chewing gum or a conventional nicotine patch.

The object of the present invention is achieved by using a ready made dietary composition with a calorie content equivalent to a maximum of 1200 kcal per day in combination with an anti-smoking composition. Surprisingly, use of a dietary composition according to the- invention in combination with an anti-smoking composition generates a higher rate of success with respect to smoking cessation than use of the anti-smoking composition on its own. Furthermore, a weight loss during the withdrawal period is often associated with the use of this combination of a dietary and an anti-smoking compositions.

In one aspect of the invention there is provided a method of curing an individual of nicotine dependence, said method comprising administration of a ready made dietary composition with a calorie content equivalent to a maximum of 1200 kcal per day in combination with a anti-smoking composition.

In another aspect of the invention there is provided a combination of a ready made dietary composition with a calorie content equivalent to a maximum of 1200 kcal per day and an anti-smoking composition. The ready made dietary composition may be a VLCD dietary composition comprising a calorie content equivalent to about 400 to 800 kcal per day, preferably 520–540 kcal per day, e.g. 530 kcal per day, when used as a full-diet replacement dietary composition. The ready made dietary composition can also be in the form of a LCD dietary composition comprising a calorie content equivalent to about 800–1200 kcal per day when used as a full-diet replacement dietary composition.

In yet another aspect of the invention there is provided a dosage programme for use of a ready made dietary composition with a calorie content equivalent to a maximum of 1200 kcal per day in combination with an anti-smoking composition. The dosage programme in one embodiment comprises a plan in the form of a calendar with instructions concerning the use of the dietary composition and/or the anti-smoking composition and/or a diet compounded by ordinarily obtainable foods, on the basis of individual characteristics such as daily nicotine or tobacco consumption, sex, weight, height, physical condition and the like.

DETAILED DESCRIPTION OF THE INVENTION

In one aspect, the present invention provides the use of a ready made dietary composition with a calorie content equivalent to a maximum of 1200 kcal per day in combination with an anti-smoking composition. Any dietary composition with a calorie content equivalent to a maximum of 1200 kcal per day can be used in combination with an anti-smoking composition according to the present invention.

Use of the dietary composition of the present invention has been found to counteract a weight gain in the weeks following smoking cessation and to increase significantly the number of people successfully completing a cure of nicotine dependence. Smokers trying to stop smoking may thus be more motivated for quitting tobacco with a higher success rate as a result. Surprisingly, the use of a combination of a dietary composition and an anti-smoking composition is much more effective in mediating smoking cessation and/or curing an individual of a nicotine dependence than the sole use of an anti-smoking composition used in a conventional cure seeking to prevent people from smoking again.

The surprisingly much more effective use of a combination of a dietary composition and an anti-smoking composition in promoting smoking cessation is not yet clear. However, the effect is most likely attributable to the administration of the dietary composition and a combination of advantageous psychological and physiological effects associated therewith.

In one aspect of the invention, the dietary composition of the combination is that disclosed in applicants co-pending application PCT/IB97/00152. It has previously been found that such a dietary composition has the effect of significantly lowering serum lipid concentrations in subjects having a normal or an increased serum lipid concentration. The dietary compositions disclosed in PCT/IB97/00152 are also capable of reducing the level of total cholesterol and total triglycerides in an individual.

In order to reduce serum lipid and/or cholesterol levels in individuals following smoking cessation, such individuals may be prescribed a low fat, low cholesterol dietary composition according to the present invention. Intake of such dietary compositions also leads to an increased number of individuals successfully completing a cure of nicotine dependence. This is clear from the results reported herein below.

It is well known that some dietary compositions may generate a euphoric effect in an individual during administration. Such a euphoric effect may be associated with chatecholamine-enhancing effects and serotonin-enhancing effects, as briefly described in the Danish Drug Catalogue (1997) on pages 110–111. Especially the chatecholamine-enhancing effects leading to an increased formation of e.g. adrenaline and noradrenaline have been attributed to the experience of a euphoric feeling.

It is now thought that the administration following smoking cessation of a dietary composition according to the invention also leads to a state of "euphoria", which is believed to be very helpful to an individual suffering from nicotine withdrawal during a cure of nicotine dependence. The state of "euphoria" is thought to arise as the serum lipids and/or cholesterol are lowered during a cure of nicotine dependence according to the present invention. The reduced amount of fats and cholesterol leads to an altered metabolism and promotes among other things the formation of compounds such as adrenaline and noradrenaline, which are both known to be positively associated with the occurrence of a feeling of "euphoria" as described above.

The overall changes in the metabolism during a low-fat diet according to the present invention are very complex indeed. These complexities combined with the not yet fully understood molecular biology of nicotine in the nervous system make it difficult to try to explain the euphoric effect putatively associated with intake of the dietary compositions of the present invention.

Most fatty acids are synthesized in the liver. The fatty acids are subsequently converted into fats and distributed to various tissues or deposited as a source of storage energy. The synthesis of fatty acids in the liver and their deposition thus ensures the availability of a readily obtainable source of energy. Importantly, fatty acids can neither be taken up nor be metabolised by the cells constituting the tissue of the brain. Accordingly, the brain depends on blood sugar in the form of glucose for energy.

The liver is also responsible for regulating the level of blood sugar and is thus capable of maintaining a constant supply of glucose to the brain for as long as a glucose source termed glycogen is present in the liver. Glycogen is metabolised under the formation of glucose under normal physiological and dietary conditions.

However, during administration of the dietary composition according to the present invention the level of both glucose and serum lipids in the body is reduced. In response to this lowering, the liver starts producing ketone compounds such as acetoacetate, 3-hydroxybutyrate and acetone. Most, if not all, extrahepatic tissues including brain tissue, can metabolise these ketone compounds.

The production of the ketone compounds is increased during fast and most likely also during administration of the dietary composition of the present invention. The signal to the liver to start synthesizing the ketone compounds is a low level of insulin in the blood and/or a correspondingly high level of hormones such as for example adrenaline, cortisol and glucagon. Accordingly, the feeling of "euphoria" associated with the formation of adrenaline and/or ketone compounds may well be increased during a low fat diet such as a diet based either wholly or partly on the dietary composition of the present invention.

The direction and scope of the research presently carried out in order to further examine a conceivable link between a feeling of "euphoria" and a reduction in nicotine withdrawal symptoms following smoking cessation are based on the hypothesis that the formation of the ketone compounds and/or the chatecholamines such as adrenaline and noradrenaline interferes with the nicotine-interacting receptors on the surface of certain target cells or neurons in the brain. These receptors will thus be occupied by the synthesised ketone compounds or chatecholamines instead of being bound by the nicotine molecule.

The fact that the chatecholamine compound adrenaline is both a hormone being synthesised in response to changes in dietary conditions and a neuron transmitter would appear to provide evidence in support of the present working hypothesis.

The hypothesis is further substantiated by the literature on nicotine molecular biology in general, and in particular by the results of studies on the effect of nicotine on the nervous system. Such results were compounded in a study published under the title "Tobakkens Biologi" (The Biology of Tobacco) in 1994 by the Danish "Tobaksskaderådet" (The Council on Tobacco Hazards), an independent advisory body to the Ministry of Health in Denmark. Part of the results of the above-mentioned study focused on the action of the nicotine molecule in the synaptic junction between two or more neurons or between a neuron and a cell.

The synaptic junction is about 150 Ångstrøm wide and necessitates the use of a so-called transmitter substance in order to transmit an impulse from one neuron to another or from a neuron to a cell. Diffusion of transmitters in the synaptic junction facilitates interaction of a transmitter with a receptor on the surface of the receiving neuron or cell capable of binding said transmitter. The ketone compound acetylcholine is widely used as a transmitter and has the formula $(CH_3)_3$—$N^+$—$(CH_2)_2$—O—CO—$CH_3$. It should be distinguished from the chatecholamines adrenalin and noradrenaline since the two latter are derivatives of the amino acid tyrosine and contain no ketone (—CO—) group.

The nicotine molecule acts in a way similar to acetylcholine in the synaptic junction and binds to the acetylcholine receptor on the surface of the receiving neuron. The acetylcholine receptor is not able to distinguish binding of acetylcholine from binding of nicotine. Consequently, nicotine is in effect able to replace the "normal" transmitter acetylcholine and may thus in high doses facilitate an increased frequency of transmission of impulses. The smoker will experience this as, for example, an increased pulse rate and blood pressure and the promotion of a state of increased "alertness" or concentration.

One significant difference between acetylcholine and nicotine is that nicotine is not degraded as rapidly as acetylcholine, once an impulse has been transmitted to the receptor neuron. Nicotine thus remains associated with the receptor of the receiving neuron for some time and consequently blocks the receptor from interacting with another transmitter substance, be it nicotine, acetylcholine, dopamine or any other transmitter substance.

Available evidence suggests that the organism is capable of counteracting this receptor "blockage" by synthesising more receptors to replace those blocked by nicotine interaction. This phenomenon is termed neuroadaption and is a defence against the effects of nicotine which serves to adapt the organism to the nicotine intake by building up a tolerance in the form of an increased number of nicotine-binding receptors. The consequence of this adaptation is that nicotine molecules acting as transmitters will be distributed to an increased number of receptors, thus lowering the overall effect of the nicotine, as more receptors have to be "charged" before an impulse is actually being transmitted. Also, the newly synthesised receptors are hypothesised to be less sensitive to nicotine binding.

The increased number of nicotine-binding receptors is thought to be responsible for mediating a nicotine dependence. The higher the number of receptors, the more nicotine is required in order to generate a "narcotic" effect. Also nicotine has the effect of mediating an increased activity in cortex and the limbic lobe, and nicotine also serves to initiate secretion from the neurons of e.g. dopamine, acetylcholine and noradrenaline, in both cortex and the limbic lobe. Dopamine is most likely responsible for generating the "soothing" feeling experienced by many smokers.

Accordingly, nicotine withdrawal experienced following smoking cessation may well be a direct measure of the increased number of neuron receptors no longer binding transmitter substances and, consequently, no longer able to secrete dopamine, acetylcholine, chatecholamines such as adrenalin and noradrenaline, and the like. Importantly, ketone compounds such as e.g acetoacetate, 3-hydroxybutyrate and acetone and/or hormones such as e.g. cortisol, glucagone, and the chatecholamines adrenaline and noradrenaline synthesised in the liver as a result of a diet comprising a dietary composition according to the present invention, may well suppress the above-mentioned withdrawal symptoms and thus increase the number of individuals successfully achieving smoking cessation and/or completing a cure of nicotine dependence. The dietary compositions of the present invention may also reduce and/or eliminate a weight gain associated with smoking cessation and/or a cure of nicotine dependence.

In view of the foregoing, the invention in a further aspect provides the use of a dietary composition with a calorie content equivalent to a maximum of 1200 kcal per day for the manufacture of a preparation for promoting smoking cessation and/or treatment of nicotine dependence.

It is preferred that the dietary composition of the invention is a composition essentially as described in Applicants co-pending application PCT/IB97/00152. Preferably, the ready made dietary composition according to the present invention is a "VLCD" (very low calorie diet) composition comprising a calorie content equivalent to about 400 to 800 kcal per day, preferably 520–540 kcal per day, e.g. 530 kcal per day, when used as a full-diet replacement dietary composition.

The "full-diet" in this respect is equivalent to any ordinarily obtainable diet without any conventional dietary restrictions and/or additional requirements. Accordingly, a "full-diet" may thus differ from person to person depending on what is regarded as a "normal" diet or a "normal" intake of food. The "replacement dietary composition" in the meaning used herein indicates the dietary composition according to the invention when used to replace the normal "full-diet" of an individual. The "replacement dietary composition" may replace the normal diet wholly or partly as explained in more detail below.

In a preferred embodiment of the invention, the ready made dietary composition is a "LCD" (low calorie diet) composition comprising a calorie content equivalent to about 800–1200 kcal per day, when such a composition is used as a full-diet replacement dietary composition.

In a 16 week long study of smoking cessation among cigarette smoking women as described in the example herein below, the use and method of the the present invention were applied to one group of individuals, whereas another group of individuals was treated with a traditional cure of nicotine dependence. The rate of success was far higher for the group following the use and method of the present invention.

To be categorized as successful in their smoking cessation subjects have to have a carbon monoxide (CO) reading in expired air of less than 10 PPM from week two to sixteen and a continuous self-reported complete abstinence (not a single puff allowed). Subjects are allowed to miss two visits between week two and sixteen. If the week two visit is missing, the subject has to be abstinent from week one until end point.

The study comprised a total of 287 participants and lasted a total of 16 weeks. Two groups comprising approximately the same number of participants were formed, and both groups were free to use a nicotine-releasing anti-smoking composition with the only proviso that the minimum nicotine dosage per day during the first 12 weeks of the study should be equivalent to 16 mg nicotine per day. After 12 weeks the use of the nicotine-releasing composition could be lowered if needed. Participants of both groups were instructed as to how they could provide a diet of ordinarily obtainable foods comprising a maximum calorie content equivalent to 1600 kcal per day. All participants followed this diet. On a periodic basis, the participants of one group were administered exclusively the ready made VLCD dietary composition instead of the diet based on ordinarily obtainable foods. This group is termed the VLCD group in the following.

FIG. 1 illustrates the number of completely abstinent individuals in the two groups. The ready made VLCD dietary composition was administered to the VLCD group during three periods of each two weeks duration during the 16 weeks, weeks 0 to 2, weeks 6 to 8, and weeks 12 to 14, as depicted in FIGS. 2 to 4. Throughout the cure, the control group was administered a diet of ordinarily obtainable foods comprising a maximum calorie content equivalent to 1600 kcal per day. It was found that 49.6% of the 137 included subjects were abstinent in the Very Low Calorie Diet (VLCD) group and 36.7% of the 150 included in the control group after 16 weeks (p<0.05).

FIG. 2 illustrates that among the abstinent subjects weight was decreased 2.1 kg in the VLCD group, but increased 1.6 kg in the control group after 16 weeks (p<0.001). In summary, in the VLCD group weight was lost simultaneously with smoking cessation. In the control group acceptable quit rates were obtained, but with moderate weight increase.

The VLCD dietary composition contained a total calorie content of 429 kcal per day. NUTRILETT® manufactured by Nycomed Pharma was used as a VLCD dietary composition, and a nicotine-containing chewing gum termed NICORETTE® from Pharmacia & Upjohn, each chewing gum having a nicotine content of 2 or 4 mg nicotine, was used as anti-smoking composition.

FIG. 3 illustrates the additional finding that 52% of the subjects in the control group attending the clinic after 1 week (n=137) reported 'Craving for cigarettes' as 'Moderate' or 'Severe' compared to only 22% in the VLCD group (n=132) (p<0.001). The corresponding numbers after two weeks were 49% in the control group (n=133) and 22% in the VLCD group (n=127)(p<0.001). The withdrawal symptom 'Increased appetite' showed the same pattern.

All subjects were told to use at least eight pieces of 2 mg nicotine chewing gums daily to control withdrawal symptoms such as craving for cigarettes, headache, restlessness and increased appetite. If the daily consumption was more than 20 pieces of 2 mg nicotine chewing gums, subjects were given the opportunity to switch to 4 mg nicotine chewing gums, or to combine 2 and 4 mg nicotine chewing gums. Subjects in the VLCD treatment group received five sachets of VLCD per treatment day. Each sachet contained 84 kcal (352 KJ) summing up to a total of 420 kcal (1.76 MJ) daily.

FIG. 4 illustrates that the participants in the VLCD group reported less problems with an increased appetite as compared to the control group on the 1600 kcal per day diet. After two weeks an increased appetite was a problem for only 25% of all individuals in the VLCD group, whereas 48% of all individuals in the control group reported such problems.

When results were evaluated after one year it was surprisingly found that the combination of the anti-smoking composition and the VLCD dietary composition (NICORETTE® and NUTRILETT® , respectively), was more than 70% more effective in promoting smoking cessation than a combination of NICORETTE® and a low fat diet comprising a maximum of 1600 kcal per day. A surprisingly large total of 27.7% of the participants in the study had stopped smoking within one year. This number is significantly higher than the numbers from similar studies reported in the literature. As a comparison, results from conventional studies have shown that only about 5% of all individuals deciding to stop smoking actually achieve smoking cessation within one year of taking their decision.

There was no weight difference between the two groups after one year. This may suggest that the use of the dietary compositions as an aid in smoking cessation are more effective during the first weeks. Those first weeks are also the most critical period, as the nicotine withdrawal is most pronounced during this time. As hypothesised above, the feeling of "euphoria" potentially associated with use of the dietary compositions of the present invention may also play a significant role during that period of the cure, as the dietary compositions may lead to an interaction of ketone compounds and/or hormones with neuron and/or cell receptors capable of binding nicotine.

Accordingly, in a preferred embodiment of the invention there is provided a replacement dietary composition which, as explained in detail above, is used periodically as a full-diet replacement, said use being periodically interrupted by periods of diet compounded by ordinarily obtainable foods. The diet compounded by ordinarily obtainable foods thus represents the "full-diet" as outlined above. It is preferred that the periodically used diet comprises a maximum calorie content equivalent to 1600 kcal per day. It is important that the diet does not exceed a limit of about 1600 to 2000 kcal per day.

It is always important to ensure that the diet is well balanced with respect to protein sources, carbohydrate sources, fat sources, flavouring agents, vitamins, minerals, electrolytes, trace elements and the like. One further advantage of using ready made dietary compositions according to the present invention is represented by the daily provision of the above-mentioned nutrient sources, vitamins and minerals, which may not always be present in the right amounts in a diet made from ordinarily obtainable foods. Insufficient amounts of nutrient sources during a diet may lead to an unhealthy degradation of for example the muscles.

In the above-mentioned study the participants in the VLCD group were administered a diet with a total calorie content of 429 kcal per day. It would in principle have been possible to use a LCD dietary composition. The difference between VLCD and LCD dietary compositions mainly lies in the amount of carbohydrate and fat used for each of the compositions. The present invention is therefore not restricted exclusively to the use of VLCD dietary compositions, but also comprises the use of LCD compositions with a calorie content equivalent to about 800–1200 kcal per day. An energy content closer to 1600 kcal per day is not likely to have any significant effect, as demonstrated by the participants in the control group of the above-mentioned study.

Preferred VLCD and LCD dietary compositions and use thereof can be provided as described below.

The following ingredients for a VLCD dietary composition were mixed:

| | |
|---|---|
| Isolated soy protein | 60 g |
| Fat | 8 g |
| Carbohydrate | 50 g |
| Soy fibre | 20 g |
| Vitamins, minerals, electrolytes and trace elements, approximately | 5 g |

The mixture was suspended in approximately 1000 ml water to provide a drink comprising about 530 kcal, corresponding to the daily dosage for a VLCD preparation.

The following ingredients for a LCD dietary composition were mixed:

| | |
|---|---|
| Isolated soy protein | 75 g |
| Fat | 22 g |
| Carbohydrate | 100 g |
| Soy fibre | 20 g |
| Vitamins, minerals, electrolytes and trace elements, approximately | 5 g |

The mixture was suspended in approximately 1000 ml water to provide a drink comprising about 880 kcal, corresponding to the daily dosage for a LCD preparation.

The above-mentioned VLCD and LCD dietary compositions were examined in a clinical trial at Karolinska Hospital, Stockholm, Sweden. The number of patients needed in each treatment group was calculated to 27 in order to detect a true treatment difference of 4 kg between the treatment groups VLCD/530 and LCD/880, using an estimate of the standard deviation of 12, using a significance level of 5%/3=1.7% and a power of 80%.

The patients were selected according to the following inclusion criteria:

Moderate to severe overweight persons with body mass index (BMI)<30 kg/m$^2$ both sexes age between 20 and 65 a self-reported, stable body weight within the last two months.

TABLE 1

Description of age (years).

| Treatment | N | Mean | SD | Min | Max |
|---|---|---|---|---|---|
| 530 kcal/day | 32 | 40.84 | 12.54 | 22 | 65 |
| 880 kcal/day | 31 | 39.39 | 10.15 | 24 | 65 |

TABLE 2

Description of sex distribution.

| Sex | 530 kcal/day | 880 kcal/day |
|---|---|---|
| Male | 10 | 10 |
| Female | 22 | 21 |

TABLE 3

Description of body mass index (kg/m$^2$)

| Treatment | N | Mean | SD | Min | Max |
|---|---|---|---|---|---|
| 530 kcal/day | 32 | 39.0 | 5.2 | 33.0 | 60.56 |
| 880 kcal/day | 31 | 38.4 | 4.3 | 32.5 | 50.7 |

The weight was recorded at every visit for the subjects in all three groups. The weight is described below.

TABLE 4

Description of weight (kg)

| | 530 kcal/day | | | | | 880 kcal/day | | | | |
|---|---|---|---|---|---|---|---|---|---|---|
| Week | N | Mean | SD | Min | Max | N | Mean | SD | Min | Max |
| 0 | 32 | 113.8 | 18.0 | 81.0 | 158.9 | 31 | 113.8 | 18.7 | 85.6 | 157.1 |
| 6 | 28 | 99.0 | 15.5 | 72.7 | 127.9 | 29 | 103.1 | 15.6 | 80.1 | 136.7 |

TABLE 5

Description of cholesterol (mmol/l)

| | 530 kcal/day | | | | | 880 kcal/day | | | | |
|---|---|---|---|---|---|---|---|---|---|---|
| Week | N | Mean | SD | Min | Max | N | Mean | SD | Min | Max |
| 0 | 32 | 5.6 | 1.0 | 3.6 | 8.0 | 31 | 5.6 | 1.0 | 3.5 | 7.4 |
| 6 | 28 | 4.2 | 0.8 | 3.1 | 5.8 | 29 | 4.1 | 0.7 | 2.8 | 5.4 |

From the above table, it can be calculated that VLCD/530 provided a cholesterol reduction of 25% in six weeks, and LCD/880 provided a cholesterol reduction of 26.8% in six weeks. In VLCD/530 the daily fat intake was 8 g, and in LCD/880 it was 22 g. The initial cholesterol level of 5.6 mmol/l in both treatment groups corresponds to a normal cholesterol level, and as can be noted, there is a significant reduction of cholesterol after six weeks, which is higher when the intake of fat, carbohydrate and soy protein is increased.

TABLE 6

Description of triglycerides (mmol/l)

| | 530 kcal/day | | | | | 880 kcal/day | | | | |
|---|---|---|---|---|---|---|---|---|---|---|
| Week | N | Mean | SD | Min | Max | N | Mean | SD | Min | Max |
| 0 | 32 | 2.0 | 1.1 | 0.8 | 5.9 | 31 | 1.8 | 1.0 | 0.7 | 4.5 |
| 6 | 28 | 1.4 | 0.5 | 0.7 | 3.1 | 27 | 1.0 | 0.3 | 0.8 | 2.3 |

From the values in the table it can be calculated that the triglyceride concentration was lowered by 30% in the group receiving the LCD/530, and 44.5% in the group receiving LCD 880. Again it can be seen that the reduction of triglyceride concentration was highest in the group receiving most fat, carbohydrate and isolated soy protein.

TABLE 7

Description of uric acid ($\mu$mol/l)

| | 530 kcal/day | | | | | 880 kcal/day | | | | |
|---|---|---|---|---|---|---|---|---|---|---|
| Week | N | Mean | SD | Min | Max | N | Mean | SD | Min | Max |
| 0 | 32 | 338.3 | 66.8 | 182 | 466 | 30 | 316.2 | 78.8 | 109 | 457 |
| 6 | 28 | 413.1 | 118.3 | 148 | 803 | 29 | 364.3 | 111.4 | 73 | 539 |

From the table it can be calculated that uric acid concentration increased by 22.1% in the group receiving the LCD/530 and by 15.2% in the group receiving the LCD/880. In a comparative study with a VLCD/420 product prepared according to EP-0 425 423 B 1 and which contained soybean concentrate with fibres, the uric acid concentration increased by 27.9% in the same six week period.

Any anti-smoking composition promoting smoking cessation and/or using tobacco can be used in combination with the dietary composition according to the invention. It is preferred that the anti-smoking composition comprises one or more nicotine-releasing agents or nicotine substitutes. Preferably, the nicotine-releasing agent is selected from the group consisting of chewing gum, a transdermal contact patch, a nosespray and an inhaler.

The combination of the dietary composition and the anti-smoking composition can be achieved in numerous ways according to the present invention. It is presently preferred that a minimal dosage nicotine per day, or nicotine substitute per day, is released over a period, whereafter the use of the anti-smoking composition either ceases immediately thereafter or after a stepping-down period with a gradual reduction of the minimal dosage. The minimal dosage of nicotine or nicotine substitute will vary from one individual to the other depending on e.g. the degree of nicotine addiction, the amount of nicotine used, the period of time used to build up a nicotine dependence and the degree of withdrawal symptoms. In one embodiment of the invention, a minimum amount of 2 mg nicotine or nicotine substitute, such as 4 mg, e.g. 6 mg, such as 8 mg, e.g. 10 mg, such as 12 mg, e.g. 14 mg, such as 16 mg, e.g. 18 mg, such as 20 mg nicotine or nicotine substituent is initially released into an individual by means of the anti-smoking composition of the present invention.

In another embodiment there is provided a gradual transition between a) periods of a diet partially or fully in the form of a ready made dietary composition according to the invention and b) periods of a full-diet made up from ordinarily obtainable foods. During the gradual transition, a mixture of dietary composition and ordinary full-diet is provided. As stated above, "full-diet" as used herein is equivalent to any ordinarily obtainable diet without any conventional dietary restrictions and/or additional requirements. The dietary composition of the transition is the composition described herein and may be a "replacement dietary composition" within the meaning of this phrase as stated above. The dietary composition in the form of a "replacement dietary composition" may replace the normal diet fully or partially.

As an alternative to a low fat and/or low cholesterol diet described herein, individuals may be treated with medicaments such as statins following smoking cessation, or they may be administered a combination of a low fat diet and statins. Statins selectively inhibit HMG-CoA-reductase, which is the controlling enzyme in the cholesterol synthesis. The enzyme increases the formation of LDL receptors and among other hereby decreases the level of LDL-cholesterol in the blood.

Some of the health hazards associated with tobacco use arise from complications and harmful effects in connection with a high serum cholesterol level and/or a high serum triglyceride level and/or a low HDL/LDL-cholesterol level in serum. It is therefore preferred that the dietary composition of the invention directly or indirectly lowers the serum cholesterol level and/or the serum triglyceride level and/or increasing the ratio of HDL/LDL-cholesterol level in serum.

In another embodiment, an agent for lowering the the serum cholesterol level and/or the serum triglyceride level and/or for increasing the HDL/LDL-cholesterol level in serum, such as for example a statin, is provided at the same time as the dietary composition and/or the ordinary full-diet.

In one preferred embodiment of the invention, the dietary composition is comprising soybean ingredients and in particular (a) isolated soy protein (b) soybean fibres and, optionally, an additional protein source, a carbohydrate source, a fat source, flavouring agents, vitamins, minerals, electrolytes, trace elements and other conventional additives, the amount of (a) being such that the protein content provides at least 15% of the total energy content of the dietary composition, and the weight ratio between (a) and (b) being at least 2. Preferably, the weight ratio between (a) and (b) is at least 2.5, and more preferably the ratio is at least 3, the most preferred value being between 3 and 4.

Isolated soy protein is the major proteinatious fraction of soybeans. It is prepared from high-quality, sound, cleaned, dehulled soybeans by removing a preponderance of the non-protein components which shall contain not less than 90% protein (N×6.25) on a moisture free basis. The dietary composition takes place through a series of steps in which the soybean protein portion is separated from the rest of the soybean. The removal of carbohydrate results in a product which is essentially bland in flavour and therefore useful in a dietary composition for humans.

The isolated soy protein used in the dietary composition of the present invention should preferably supply all the essential amino acids in the amounts required for humans. Preferably, the isolated soy protein should meet or exceed the essential amino acid requirement pattern for children and adults as established by the Food and Agricultural Organisation, World Health Organisation and United Nations University (FAO/WHO,UNU). Also the preferred isolated soy protein should be highly digestible, comparable in digestibility to milk, meat, fish and egg protein. Finally, the preferred isolated soy protein shall be effective in maintaining nitrogen balance when consumed at the recommended protein intake level. Preferred isolated soy protein products which meet the foregoing requirements are supplied by Protein Technologies International under the brand name SUPRO®. SUPRO® isolated soy proteins are supplied in many different qualities. One particularly preferred product is SUPRO PLUS® 2100, which is a protein product consisting of isolated soy protein, sweet diary whey and calcium phosphate. It offers excellent nutritional properties, a bland flavour and smooth mouthfeel. It is spray-dried to provide excellent dispersion and suspension properties, and it is particularly recommended for dry-blended beverages designed to be mixed with water, juice or milk. Another particularly preferred isolated soy protein product is SUPRO® 661, which is a protein which offers excellent dispersion, bland flavour and excellent nutritional properties. It has a high bulk density and is therefore recommended for dry-blended applications requiring a high density protein source to achieve certain can fill requirements.

Preferably, the isolated soy protein is the main or sole protein source in a dietary composition according to the present invention. However, parts of the protein source may be provided by other proteins such as soy protein concentrate, skimmed milk, preferably as a powder, and other vegetable or animal, including diary, proteins. Preferably, at least 90 weight % of the protein source is isolated soy protein, and less preferred at least 50% of the protein source is isolated soy protein.

The soybean fibres used in the dietary composition of the present invention are fibres which may be isolated from soybeans in a number of different ways. One available source would be soy protein concentrate, as discussed above. Preferably, the soybean fibres are isolated from the cotyledon of soybeans. In particular, such fibres are derived from dehulled and defatted soybean cotyledon and are comprised of a mixture of cellulosic and non-cellulosic internal cell-wall structural components. Such fibres are distinctly different from soy fibres derived from soy hulls as well as other fibre sources. Soy cotyledon fibres are blandtasting, contain no cholesterol and are low in fat and sodium. They have good water-binding properties and low caloric content, which make them ideal as bulking agents. Soy cotyledon fibres supplied in a fat-modified and low-cholesterol diet have been found to further reduce blood cholesterol level in subjects with elevated plasma cholesterol levels. The effect is a lowering of serum total cholesterol and a lowering of LDL-cholesterol. HDL-cholesterol and total triglycerides are not significantly affected by soy cotyledon fibres. In the present invention, soybean fibres, in particular from the cotyledon of soybeans, are believed to provide a synergistic effect in combination with isolated soy protein so as to lower lipid concentration in subjects both having normal and elevated concentrations of total cholesterol and total triglycerides. The amount of soybean fibres shall be a maximum of 50 weight % of the isolated soy protein, and preferred amounts are between 25 and 33 weight %. The amount of soybean fibres is preferably at least 5 weight % of the total weight of the dietary composition on a dry basis. The preferred daily dosage, when the dietary composition of the invention is used as a total diet, is 20–30 g soybean fibres. A particularly preferred soy cotyledon fibre product is manufactured by Protein Technologies International under the trademark FIBRIM®, and among the various soy fibres produced under the FIBRIM® brand, FIBRIM® 1020 is preferred according to the present invention because it has a particularly good mouthfeel and dispersion for dry-blended beverage applications.

As mentioned above, isolated soy protein is preferably the main or sole source of protein, but other proteins may be present. The protein content should provide at least 15% of the total energy content of the dietary composition. More preferred, the protein provides at least 20%, preferably at least 25% and more preferred at least 30% of the total energy content of the dietary composition. In terms of weight, it is preferred that the isolated soy protein amounts to no less than 50 weight %, preferably no less than 75 weight %, and more preferred no less than 90 weight %, of the total protein content of the dietary composition.

A dietary composition according to the present invention may optionally comprise a carbohydrate source, a fat source, flavouring agents, vitamins, minerals, electrolytes, trace elements and other conventional additives. If any of these optional ingredients are not present in the dietary composition of the invention, they should normally be supplied as a supplement to the dietary composition of the invention, so that an adequate supply of all essential dietary ingredients is ensured. If the dietary composition of the invention is intended to supply a substantial part of the food intake of a subject, the optional ingredients are preferably present, so that separate intake thereof can be avoided. This is of particular importance for overweight or obese subjects on a weight reduction treatment, by which it is important that all essential dietary ingredients are supplied in the recommended amounts.

When a carbohydrate source is present in the dietary composition, it is preferably present in an amount of less than 50 weight % of the dietary composition. Preferably, the amount of carbohydrate amounts to at least 20 weight %, more preferred at least 25 weight %, and most preferred at least 30 weight %, of the dietary composition. The preferred carbohydrates for use in the invention are glucose, fructose and/or maltodextrine. Skimmed milk and cocoa are other possible carbohydrate sources.

When a fat source is present in the dietary composition of the invention, it is usually present in an amount from 3 to 50 weight %, preferably 4 to 40 weight %, more preferably from 4 to 12 weight %, and most preferably from 5 to 10 weight %, of the dietary composition. The fat source will preferably comprise polyunsaturated fatty acids and-monounsaturated fatty acids as well as saturated fatty acids. The amount of polyunsaturated fatty acids and monounsaturated fatty acids, including the essential fatty acids, may range from 35 to 50, preferably 38 to 44, weight % of the total amount of the fat source. The essential fatty acids are also called omega-6 and omega-3 fatty acids and include linolic acid and linolenic acid. The amount of saturated fatty acids may be from 20 to 30 weight %, preferably 22 to 26 weight %, of the total amount of fat.

Normally, the dietary composition of the invention will also comprise one or more flavouring agents such as cocoa, vanilla, lime, strawberry or soup flavours, such as mushroom, tomato or bouillon.

Vitamins and minerals will be added to the dietary composition in accordance with the limits laid down by health authorities. Preferably, the dietary composition of the invention will comprise all recommended vitamins and minerals. The vitamins will typically include A, B1, B2, B12, folic acid, niacin, panthotenic acid, biotin, C, D, E and K. The minerals will typically include iron, zink, iodine, copper, manganese, chromium and selenium. Electrolytes, such as sodium, potassium and chlorides, trace elements and other conventional additives are also added in recommended amounts.

The dietary composition of the invention may take any form which is suitable for human consumption. In a preferred embodiment, the dietary composition is a powdery mixture which is suspensible, dispersible or emulsifiable in a water-containing liquid such as water, coffee, tee or fruit juice. For such purpose, the dietary composition is preferably packed in a package intended for covering the total nutrition requirement for a defined period of time, such as three days or a week, whereby the dietary composition will be divided into suitable sub-units of a daily dose, preferably four to five sub-units for women and four to six sub-units for men per daily dosage, which are packed separately before being packed into the package, or the package will be provided with means for apportioning of such subunits.

In another preferred embodiment, the dietary composition of the invention is a liquid dietary composition in a water-containing liquid, in which the solid ingredients are suspended, dispersed or emulsified in an amount of 10 to 25 weight %. When the liquid dietary composition is intended for drinking, it will usually comprise a flavouring agent as discussed above. However, the liquid dietary composition may also be used for intravenous administration or for probe administration.

In a further embodiment, the dietary composition of the invention may be in the form of a solid dietary composition such as a nutritional bar, fruit bar, cookie, cake, bread or muffin.

Overweight or obese smokers particularly often have an increased serum cholesterol level and an increased triglyceride level, and the dietary composition of the invention will have the effect of lowering these variables particularly during smoking cessation. However, the dietary composition of the invention also has a substantial lowering effect on total serum cholesterol level and total triglyceride level in persons having a normal lipid profile. For the purpose of the present invention, subjects having an initial total serum cholesterol level of 5.7 mmol/l or below are considered to have a normal or hypocholesterolemic level, whereas subjects having a total serum cholesterol level above 5.7 mmol/l are considered to be hypercholesterolemic.

It is believed that a significant lipid-lowering effect has not previously been introduced in a cure of nicotine dependence in combination with an anti-smoking composition. Use of the present dietary composition on basis of soybean ingredients comprising isolated soy protein and soybean fibres such as soy cotyledon fibres in such a cure is therefore believed to be unique.

Accordingly, in one embodiment of the invention there is provided the use of a dietary composition according to the invention as a medicament for lowering the blood cholesterol level and the triglyceride level, and for increasing the HDL/LDL-cholesterol ratio in serum following smoking cessation. The medical use of the dietary composition according to the invention is not limited to overweight or obese subjects, but may also be used for normal weight subjects having increased serum cholesterol level. The dietary composition according to the invention also has a lowering effect upon the increase in uric acid concentration normally observed when an individual is participating in a weight reduction treatment, during which treatment protein may be degraded from the fat-free body mass, e.g. the musculature. Therefore, a dietary composition according to the invention provides for increased safety during a weight loss period or a weight control period following smoking cessation.

A dietary composition according to the invention may also be used for lowering cholesterol in hypercholesterolemic smokers, optionally following smoking cessation. For example, one to three daily meals of ordinary food can be replaced by a dietary composition according to the present invention. Hereby, significant cholesterol and triglyceride reductions can be obtained, as well as improvement of the HDL/LDL-cholesterol ratio.

For use in a weight loss treatment following smoking cessation, the daily dose of the dietary composition of the invention may comprise an energy content from 400 to 800 kcal per day, in particular from 450 to 800 kcal/day, which is considered to be a very low calorie diet (VLCD), or it may comprise from 800 to 1200 kcal/day, which is considered to be a low-calorie diet (LCD).

In another aspect of the invention, there is provided a method of promoting smoking cessation and/or curing an individual of nicotine dependence, said method comprising administration of a ready made dietary composition with a calorie content equivalent to a maximum of 1200 kcal per day in combination with a anti-smoking composition. The ready made dietary composition may be a VLCD dietary composition comprising a calorie content equivalent to about 400 to 800 kcal per day, preferably 520–540 kcal per day, e.g. 530 kcal per day, when used as a full-diet replacement dietary composition. There is also provided a ready made dietary composition in the form of a LCD dietary composition comprising a calorie content equivalent to about 800–1200 kcal per day when used as a full-diet replacement dietary composition.

In one aspect of the method, the dietary composition periodically is used as a full-diet replacement dietary composition, said use being periodically interrupted by periods of full-diet compounded by ordinarily obtainable foods. In one embodiment, the diet comprises a maximum calorie content equivalent to 1600 kcal per day.

The method in one embodiment comprises an anti-smoking composition in the form of one or more nicotine-releasing agents or nicotine substitutes. Nicotine-releasing agents such as chewing gums, transdermal contact patches, nosesprays, and inhalers are particularly preferred.

In another embodiment of the invention, a minimal dosage nicotine or nicotine substituent per day is released over a period, whereafter the use of the anti-smoking composition either ceases immediately thereafter, or after a stepping-down period with a gradual reduction of the minimal dosage. It is particularly preferred that a minimum amount of about 10 mg nicotine or nicotine substitute is initially released by means of the anti-smoking composition.

In one embodiment of the method, a gradual transition exists between periods of a ready made replacement dietary composition and periods of a full-diet made up from ordinarily obtainable foods, and during said gradual transition a mixture of replacement dietary composition and full-diet is provided.

In another embodiment of the method, there is provided a lowering of the serum cholesterol level and/or the serum triglyceride level and/or an increase of the ratio of HDL/LDL-cholesterol level in serum. This may be achieved by using an agent for lowering the the serum cholesterol level and/or the serum triglyceride level and/or for increasing the HDL/LDL-cholesterol level in serum is provided at the same time as the dietary composition and/or the diet.

In yet another aspect of the invention there is provided a combination of a ready made dietary composition with a calorie content equivalent to a maximum of 1200 kcal per day and an anti-smoking composition. The combination may comprise the ready made dietary composition as a VLCD dietary composition comprising a calorie content equivalent to about 400 to 800 kcal per day, preferably 520–540 kcal per day, e.g. 530 kcal per day, when used as a full-diet replacement dietary composition. In another embodiment, the ready made dietary composition is a LCD dietary composition comprising a calorie content equivalent to about 800–1200 kcal per day when used as a full-diet replacement dietary composition.

The anti-smoking composition of the combination may comprise one or more nicotine-releasing agents or nicotine substitutes, preferably in the form of chewing gum, a transdermal contact patch, a nosespray, or an inhaler. Preferably a minimum amount of 10 mg nicotine or nicotine substitute is initially released by means of the anti-smoking composition.

In another embodiment, the combination provides a dietary composition capable of lowering of the serum cholesterol level and/or the serum triglyceride level and/or an increase of the ratio of HDL/LDL-cholesterol level in serum.

In yet another aspect there is provided a dosage programme for use with a ready made dietary composition with a calorie content equivalent to a maximum of 1200 kcal per day in combination with an anti-smoking composition. In one preferred embodiment, the dosage programme comprises a plan in the form of a calendar with instructions concerning the use of the dietary composition and/or the anti-smoking composition and/or a diet compounded by ordinarily obtainable foods, on the basis of individual characteristics such as daily nicotine or tobacco consumption, sex, weight, height, physical condition and the like.

In another embodiment, the programme comprises a computer programme on for example a disc or a compact disc (CD) for monitoring the use of the dietary composition and/or the anti-smoking composition and/or a diet compounded by ordinarily obtainable foods, on the basis of individual characteristics such as daily nicotine or tobacco consumption, sex, weight, height, physical condition and the like.

There is also provided a combination according to the invention further comprising a dosage programme according to the invention. In one embodiment, the combination further comprising the dosage programme is pre-packed in a container.

The invention will be further illustrated in the following figures and the non-limiting example.

BRIEF DESCRIPTION OF THE FIGURES

FIG. 1 illustrates the number of completely abstinent individuals during a cure of nicotine dependence lasting 16 weeks. The ready made VLCD dietary composition was administered to the VLCD group during three periods of each two weeks duration during the 16 weeks, weeks 0 to 2, weeks 6 to 8, and weeks 12 to 14. Throughout the cure, the control group was administered a diet of ordinarily obtainable foods comprising a maximum calorie content equivalent to 1600 kcal per day. It was found that 49.6% of the 137 individuals included subjects were abstinent in the Very Low Calorie Diet (VLCD) group and 36.7% of the 150 individuals included in the control group were abstinent after 16 weeks ($p<0.05$).

FIG. 2 illustrates that among the abstinent subjects weight on average had decreased 2.1 kg in the VLCD group, but increased 1.6 kg in the control group after 16 weeks ($p<0.001$). In summary, in the VLCD group weight was lost simultaneously with smoking cessation. In the control group acceptable quit rates were obtained, but at the expense of a moderate weight gain.

FIG. 3 illustrates the additional finding that 52% of the subjects in the control group attending the clinic after 1 week (n=137) reported 'Craving for cigarettes' as 'Moderate' or 'Severe' compared to only 22% in the VLCD group (n=132) ($p<0.001$). The corresponding numbers after two weeks were 49% in the control group (n=133) and 22% in the VLCD group (n=127)($p<0.001$).

FIG. 4 illustrates that the participants in the VLCD group reported less problems of increased appetite as compared to the control group on the diet comprising a maximum of 1600 kcal per day. After two weeks an increased appetite was a problem for only 25% of all individuals in the VLCD group, whereas 48% of all individuals in the control group reported such problems.

EXAMPLE

Aims

To investigate whether nicotine chewing gum (NICORETTE®, Pharmacia & Upjohn) together with smoking cessation and diet recommendations results in higher smoking cessation rates if combined with a Very Low Calorie Diet (VLCD, NUTRILETT®, Nycomed Pharma) in slightly overweight women who reported previous weight gain following smoking cessation as a reason for relapse to smoking.

Inclusion criteria
 Female
30–60 years
BMI 23–31 $kg/m^2$
Smoking 10 or more cigarettes per day
Smoking three years or more
At least one attempt to quit smoking but started again because of weight gain
Exclusion criteria
Gout, porphyria, diabetes mellitus type 1
Vegetarian diet
Pregnant or breast feeding
Severe renal or hepatic disease
Lactose intolerance
Study design

| Group | Intervention | Included Subjects |
|---|---|---|
| Control | Nicotine gum 12 + 4 weeks, cessation and diet recommendations | 150 |
| VLCD | As above amplified with Very Low Calorie Diet (VLCD) 3 × 2 weeks | 137 |

Intervention
Treatment in groups, 10–15 patients.
Weight, CO, smoking status, medication, adverse events and withdrawal symptoms were registered at each visit.
Additional analysis included smoking and weight history, saliva cotinine, withdrawal symptoms, Fagerström Test of Nicotine Dependence, Weight control-smoking questionnaire and Waist Hip Ratio.
Keton body analysis in urine to check VLCD compliance.
Demography (mean values at baseline visit) Results

|  | Cigs/day | CO | Age when staring smoking | Blood pressure |
|---|---|---|---|---|
| Control | 19.1 | 18.2 ppm | 16.5 yr. | 128/81 mmHg |
| VLCD | 20.0 | 18.6 ppm | 16.1 yr. | 125/80 mmHg |

|  | Pulse | Height | Weight | Waist/Hip (ratio) | BMI |
|---|---|---|---|---|---|
| Control | 76.4 bpm | 167 cm | 74.7 kg | 0.82 | 26.9 $kg/m^2$ |
| VLCD | 77.1 bpm | 166 cm | 73.9 kg | 0.82 | 26.7 $kg/m^2$ |

Definition of successful smoking cessation
To be categorized as successful in their smoking cessation subjects had to have a carbon monoxide (CO) reading in expired air of less than 10 PPM from week two to sixteen and a continuous self reported complete abstinence (not a single puff allowed). Subjects were allowed to miss two visits between week two and sixteen. If the week two visit was missing, the subject had to be abstinent from week one until end point.
Smoking cessation
49.6% of the 137 included subjects were abstinent in the Very Low Calorie Diet (VLCD) group and 36.7% of the 150 included in the control group after 16 weeks ($p<0.05$).

An additional finding was that 52% of subjects in the control group attending the clinic after 1 week (n=137) reported 'Craving for cigarettes' ad 'Moderate' or 'Severe' compared to only 22% in the VLCD group (n=132) ($p<0.001$). The corresponding numbers after two weeks were 49% in the control group (n=133) and 22% in the VLCD group (n=127)($p<0.001$).The withdrawal symptom 'Increased appetite' shows the same pattern.
Weight development
Among the abstinent subjects weight was decreased 2.1 kg in the VLCD group, but increased 1.6 kg in the control group after 16 weeks ($p<0.001$).
Summary results
In the VLCD group weight was lost simultaneously with smoking cessation. In the control group acceptable quit rates were obtained but with moderate weight increase.

Compliance to treatment

All subjects were told to use at lest eight pieces of 2 mg gums daily to control withdrawal symptoms such as craving for cigarettes, headache, restlessness and increased appetite. If the daily consumption was more than 20 pieces of 2 mg gums, subjects were given the opportunity to switch to 4 mg gums, or to combine 2 and 4 mg gums. Subjects in the VLCD treatment group received five sachets of VLCD per treatment day. Each sachet contains 84 kcal (352 KJ) summing up to a total of 420 kcal (1.76 MJ) daily.

Mean number of chewing gums used daily

| Week | 1 | 2 | 3 | 4 | 6 | 8 | 10 | 12 | 14 | 16 |
|------|---|---|---|---|---|---|----|----|----|----|
| Control | 8.5 | 9.5 | 9.7 | 9.9 | 9.6 | 9.1 | 8.9 | 7.7 | 7.1 | 5.0 |
| VLCD | 7.4 | 8.0 | 8.7 | 8.9 | 9.2 | 9.0 | 8.7 | 8.3 | 7.7 | 6.5 |

Compliance to VLCD treatment

| Week | 1–2 | 6–8 | 12–14 |
|------|-----|-----|-------|
| VLCD | 75% | 31% | 18% |

What is claimed is:

1. Method of promoting smoking cessation and/or curing an individual of nicotine dependence, said method comprising administering to an individual in need thereof a ready made dietary composition with a calorie content equivalent to a maximum of 1200 kcal per day in combination with a anti-smoking composition.

2. Method according to claim 1 wherein the dietary composition comprises a composition on the basis of soybean ingredients comprising
   (a) isolated soy protein, and
   (b) soybean fibres,
   and optionally an additional protein source, a carbohydrate source, a fat source, flavouring agents, vitamins, minerals, electrolytes, trace elements and other conventional additives.

3. Method according to claim 2 wherein the amount of (a) being such that the protein content provides at least 15% of the total energy content of the composition, and the weight ratio between (a) and (b) being at least 2.

4. Method according to claim 3, wherein the weight ratio between (a) and (b) is at least 3.

5. Method according to claim 2, wherein the weight ratio between (a) and (b) is 3 to 4.

6. Method according to claim 2, wherein the soybean fibres are isolated from the cotyledon of soybeans.

7. Method according to claim 2, wherein the protein provides at least 20% of the total energy content of the composition.

8. The method according to claim 7 wherein the protein provides at least 25% of the total energy content of the composition.

9. The method according to claim 7 wherein the protein provides at least 30% of the total energy content of the composition.

10. Method according to claim 2, wherein the isolated soy protein amounts to no less than 50 weight % of the total protein content of the composition.

11. Method according to claim 2, wherein the composition further comprises a carbohydrate source in an amount of less than 50 weight % of the composition.

12. Method according to claim 11, wherein the carbohydrate source is glucose, fructose and/or maltodextrine.

13. Method according to claim 2, wherein the composition further comprises a fat source in an amount from 3 to 50 of the composition.

14. Method according to claim 13, wherein the fat source comprises essential polyunsaturated fatty acids, monounsaturated fatty acids and saturated fatty acids.

15. Method according to claim 2, wherein the amount of soybean fibres is at least 5% by weight on a dry basis.

16. Method according to claim 2, wherein the composition further comprises essential vitamins, minerals and trace elements.

17. Method according to claim 2, wherein the composition is in the form of a powdery mixture being suspensible, dispersible or emulsifiable in a water-containing liquid.

18. The method according to claim 17 wherein the water-containing liquid is selected from the group consisting of water, coffee, tea, and fruit juice.

19. Method according to claim 2, wherein the composition is a liquid composition.

20. Method according to claim 19, wherein the composition is suspended, dispersed or emulsified in an amount of 10 to 25 weight %.

21. Method according to claim 19, wherein the composition is a drinkable, liquid composition comprising a flavouring agent.

22. The method according to claim 21 wherein the flavoring agent is selected from the group consisting of cocoa, vanilla, lime, strawberry, mushroom, tomato, and bouillon.

23. Method according to claim 19, for intravenous administration or for probe administration.

24. Method according to claim 2, wherein the composition is a solid composition.

25. Method according to claim 24, wherein the composition is in the form of a nutritional bar, fruit bar, cookie, cake, bread or muffin.

26. Method according to claim 2, wherein the composition comprises a partial or a total diet for an overweight or obese subject.

27. Method according to claim 26, wherein the overweight or obese subject has an increased total serum cholesterol level, an increased LDL-cholesterol level and/or an increased total serum triglyceride level.

28. Method according to claim 27, in combination with a lipid lowering medicament.

29. The method according to claim 2 wherein the isolated soy protein amounts to no less than 75 weight % of the total protein content of the composition.

30. The method according to claim 2 wherein the isolated soy protein amounts to no less than 90 weight % of the total protein content of the composition.

31. The method according to claim 2 wherein the composition further comprises a fat source in an amount from 4 to 40 weight % of the composition.

32. The method according to claim 2 wherein the composition further comprises a fat source in an amount from 4 to 12 weight % of the composition.

33. The method according to claim 2 wherein the composition further comprises a fat source in an amount from 5 to 10 weight % of the composition.

34. Method according to claim 1, wherein the ready made dietary composition is a VLCD dietary composition comprising a calorie content equivalent to about 400 to 800 kcal per day, when used as a full-diet replacement dietary composition.

35. Method according to claim 11, wherein the ready made dietary composition is a LCD dietary composition comprising a calorie content equivalent to about 800–1200 kcal per day when used as a full-diet replacement dietary composition.

36. Method according to claim 1, wherein the dietary composition periodically is used as a full-diet replacement dietary composition, said use being periodically interrupted by periods of full-diet compounded by ordinarily obtainable foods.

37. Method according to claim 36, wherein the periodically used full-diet comprises a maximum calorie content equivalent to 1600 kcal per day.

38. Method according to claim 1, wherein the anti-smoking composition comprises one or more nicotine-releasing agents or nicotine substitutes.

39. Method according to claim 38, wherein the nicotine-releasing agent is chewing gum, transdermal contact patch, nosespray, or inhaler.

40. Method according to claim 1, wherein a minimal dosage nicotine per day or nicotine substitute per day is released over a period, whereafter the use of the anti-smoking composition either ceases immediately thereafter, or after a stepping-down period with a gradual reduction of the minimal dosage.

41. Method according to claim 11, wherein a minimum amount of 10 mg nicotine or nicotine substitute is initially released by means of the anti-smoking composition.

42. Method according to claim 11, wherein a gradual transition exists between periods of a ready made replacement dietary composition and periods of a full-diet made up from ordinarily obtainable foods, and during said gradual transition a mixture of replacement dietary composition and full-diet is provided.

43. Method according to claim 11, wherein the dietary composition has an effect comprising a lowering of the serum cholesterol level and/or the serum triglyceride level and/or an increase of the ratio of HDL/LDL-cholesterol level in serum.

44. Method according to claim 11, wherein an agent for lowering the the serum cholesterol level and/or the serum triglyceride level and/or for increasing the HDL/LDL-cholesterol level in serum is provided at the same time as the dietary composition and/or the diet.

45. The method according to claim 1, wherein isolated soy protein supplies all of the essential amino acids in the amounts required for humans.

46. The method according to claim 1 wherein the lipid lowering medicament is a statin.

47. The method according to claim 1 wherein the ready made dietary composition is a VLCD dietary composition comprising a calorie content equivalent to about 520–540 kcal per day when used as a full-diet replacement dietary composition.

48. The method according to claim 1 wherein the ready made dietary composition is a VLCD dietary composition comprising a calorie content equivalent to about 530 kcal per day when used as a full-diet replacement dietary composition.

49. Combination of a ready made dietary composition with a calorie content equivalent to a maximum of 1200 kcal per day and an anti-smoking composition.

50. Combination according to claim 49, wherein the ready made dietary composition is a VLCD dietary composition comprising a calorie content equivalent to about 400 to 800 kcal per day, when used as a full-diet replacement dietary composition.

51. Combination according to claim 49, wherein the ready made dietary composition is a LCD dietary composition comprising a calorie content equivalent to about 800–1200 kcal per day when used as a full-diet replacement dietary composition.

52. Combination claim 49, wherein the anti-smoking composition comprises one or more nicotine-releasing agents or nicotine substitutes.

53. Combination according to claim 52, wherein the nicotine-releasing agent is chewing gum, transdermal contact patch, nosespray, or inhaler.

54. Combination according to any of claim 49, wherein a minimum amount of 10 mg nicotine or nicotine substitute is initially released by means of the anti-smoking composition.

55. Combination according to claim 49, wherein the dietary composition has an effect comprising a lowering of the serum cholesterol level and/or the serum triglyceride level and/or an increase of the ratio of HDL/LDL-cholesterol level in serum.

56. A kit comprising the combination of claim 49 and instructions for use of the combination to achieve smoking cessation and/or a cure of nicotine addiction.

57. Combination according to claim 49 wherein the ready made dietary composition is a VLCD dietary composition comprising a calorie content equivalent to about 520–540 kcal per day when used as a full-diet replacement dietary composition.

58. Combination according to claim 49 wherein the ready made dietary composition is a VLCD dietary composition comprising a calorie content equivalent to about 530 kcal per day when used as a full-diet replacement dietary composition.

* * * * *

UNITED STATES PATENT AND TRADEMARK OFFICE
CERTIFICATE OF CORRECTION

PATENT NO. : 6,153,629
DATED : November 28, 2000
INVENTOR(S) : Lars Henrik Hoie

It is certified that error appears in the above-identified patent and that said Letters Patent is hereby corrected as shown below:

Column 22, claim 35,
Line 66, change "11" to -- 1 --.

Column 23, claim 41,
Line 23, change "11" to -- 1 --.

Column 23, claim 42,
Line 26, change "11" to -- 1 --.

Column 23, claim 43,
Line 32, change "11" to -- 1 --.

Column 23, claim 44,
Line 37, change "11" to -- 1 --.

Signed and Sealed this

Twenty-ninth Day of January, 2002

Attest:

Attesting Officer

JAMES E. ROGAN
Director of the United States Patent and Trademark Office